No. 842,255. PATENTED JAN. 29, 1907.
A. SCHWARZ.
PROCESS OF CONCENTRATING ORES.
APPLICATION FILED JULY 19, 1905.
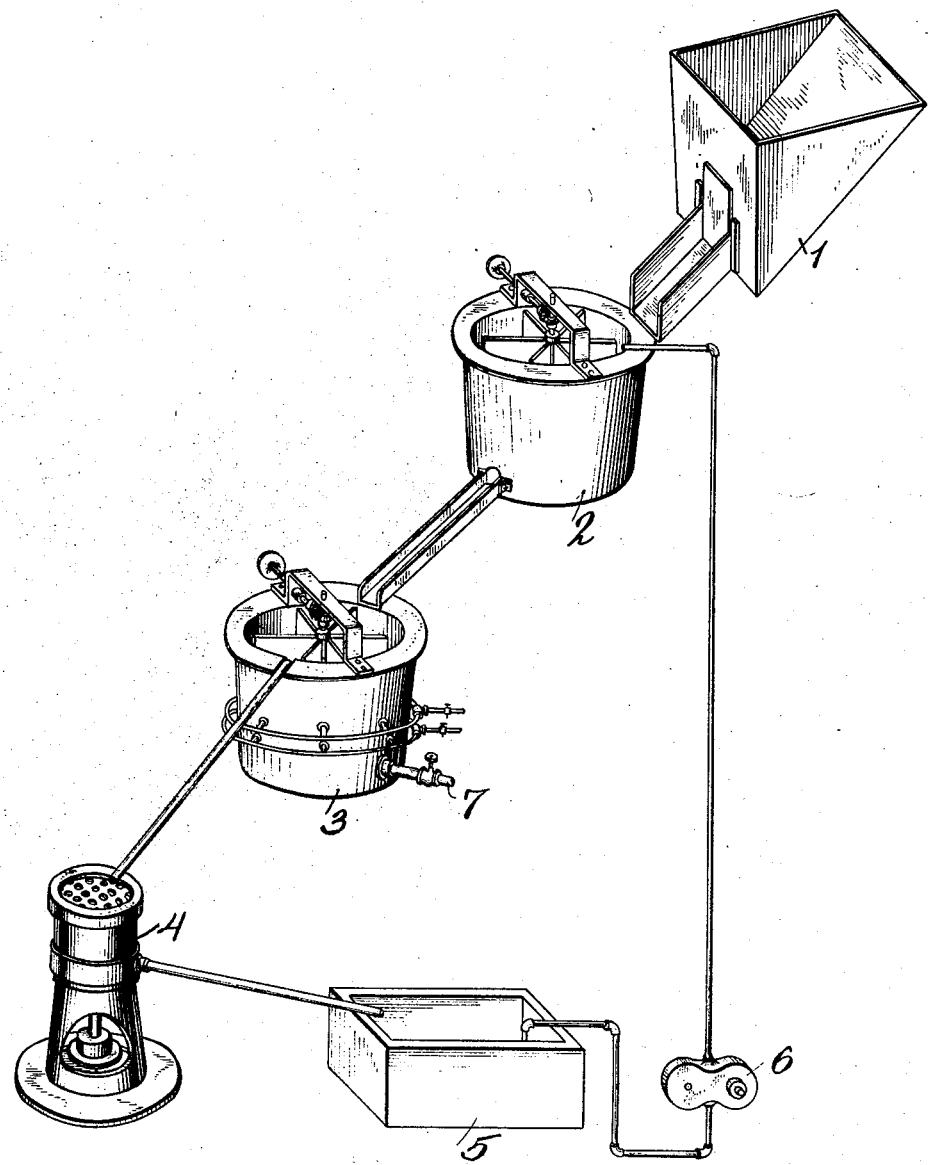
WITNESSES:
M. E. McNuich
E. G. Davis
INVENTOR
Alfred Schwarz
BY
Charles D. Jones.
His ATTORNEY

UNITED STATES PATENT OFFICE.

ALFRED SCHWARZ, OF NEW YORK, N. Y., ASSIGNOR TO SCHWARZ ORE TREATING COMPANY, OF PHŒNIX, ARIZONA TERRITORY, A CORPORATION OF ARIZONA TERRITORY.

PROCESS OF CONCENTRATING ORES.

No. 842,255.     Specification of Letters Patent.     Patented Jan. 29, 1907.

Application filed July 19, 1905. Serial No. 270,340.

*To all whom it may concern:*

Be it known that I, ALFRED SCHWARZ, a subject of the Emperor of Germany, and a resident of the borough of Manhattan, city, county, and State of New York, have invented certain new and useful Improvements in the Processes of Concentrating Ores, of which the following is a specification.

The present invention relates to a method of concentrating ores, the object being to effect the separation and recovery of the values by the employment of what is known as "rosin-oil" as an adhesive agent. This oily complex hydrocarbon is a product of destructive distillation of rosin, is very viscid and has a tarry odor, and in color varies from light yellow to dark brown. The invention contemplates the employment of this oil alone or in combination of a normally solid hydrocarbon, as paraffin, or a resinous hydrocarbon, as rosin, pitch, or asphaltum, or with fatty matters, as stearin or palmitin, or various mixtures of the above materials may be made, including rosin-oil as one of the ingredients. Additionally sulfur may be added to the oil or any of the compounds containing it.

I will describe, first, the mode of procedure when using rosin-oil alone.

The ore is first pulverized and in its dry condition or mixed with water in any suitable quantity mixed with sufficient rosin-oil to make a mass pasty at ordinary temperatures. The kettle in which the mixture is effected may be provided with an agitator, the action of which is continued long enough to effect and maintain thorough and intimate mixture of the ore and oil. The mixing-kettle may be heated, if desired, and air, steam, or gas injected into the mass to assist in effecting the desired mixture. The injection of a gaseous fluid gives a certain sponginess, which increases its floating power. After the mixing operation the concentrates may be recovered by running the mass of ore and oil into a separating vessel containing water, which may be cold or heated to any desired temperature up to the boiling-point. Upon coming into contact with the water a separation takes place. The oil entraps and buoys up the metallic constituents of the ore and rises to the surface of the water, while the tailings are liberated or washed out from the mass and settle in the bottom of the vessel, from which they may be removed or collected as desired. The rosin-oil, with the entrapped values, is floated or screened off from the surface of the bath and run to a centrifugal machine, in which is effected a separation of the concentrates from the oil in a well-known manner. The concentrates are then collected and subjected to such further treatment as may be necessary or desired. The separating vessel may be provided with suitable shelves or stirrers to maintain its contents in circulation and to bring all parts of the mixture of the oil and ore into contact with the water.

The water by which the above separation is effected may be acidulated, if desired. Also instead of running the mass into a separate vessel cold or heated water may be injected into the mass in the mixing vessel to effect the desired separation. It is preferable, however, to use separate vessels, as the operation may thereby be made continuous.

The invention may also be practiced by using a compound of rosin-oil and a hydrocarbon solid at normal temperatures, such as paraffin, the oil being added in any desired proportion, according to the character of the ore treated. A compound of fifty per cent. of each, by weight, is semiliquid and has been employed by me with advantage. A compound of rosin-oil and a resinous hydrocarbon, such as rosin, pitch, or asphaltum, may be used. Rosin is soluble in such oil, and the compound, like that of rosin-oil and paraffin, may range from a liquid condition to one that is pasty or solid at normal temperatures, depending on the quantity of rosin-oil employed. Also compounds of rosin-oil and a fatty matter, such as stearin or palmitin, may be used ranging from the condition of a liquid to pasty or solid at normal temperatures. I also contemplate the employment of rosin-oil in combination with any animal, mineral, or other vegetable oil which is liquid at normal temperatures, as I have found the addition of rosin-oil to a normally liquid or solid hydrocarbon or a fatty matter makes an effective agent for the separation of the values from the ores.

When using a compound containing rosin-oil which is liquid at normal temperatures the method pursued is the same as that above described in connection with the use of rosin-oil alone. When using a compound containing rosin-oil which is pasty or solid at normal temperatures the only variation is that which necessitates the employment of heat to liquefy and maintain the compound in a liquid condition. The initial mixing with the ore may be effected in a steam-jacketed vessel provided with an agitator, or the compound may be liquefied in a separate vessel and then run into the mixing vessel. When using such compound the water in the separating vessel should be heated sufficiently to maintain the compound in a liquid condition. As the compound rises to the surface, it is run to a centrifugal drum to separate the compound from the values, or the compound, with the entrapped values, may be run to a storage vessel, in which it is kept liquefied, and then run to the centrifugal drum. A modification of this method may be practiced by allowing the compound, with the entrapped values, to return to its normal pasty or solid condition or to solidify it by the use of cold instead of heated water. After being collected in a suitable vessel the solidified compound may be liquefied by heat and the values separated therefrom in a centrifugal drum. I prefer, however, to use heated water, as thereby the compound is maintained throughout in its liquid condition.

In my Patent No. 807,505, dated December 19, 1905, I have described and claimed a method in which is used a compound of a hydrocarbon and sulfur. I therefore contemplate the addition of sulfur to rosin-oil or any compound containing it as an ingredient in such cases as may be deemed necessary or advisable. The sulfur, preferably in powdered form, may be dissolved in any of its known solvents and a mixture thereof with the rosin-oil or any of its compounds added to the ore, or a direct mixture without the aid of a solvent may be made. The operations of mixing with the ore, the separation of the adhesive agent, with the entrapped values, from the tailings, and the final recovery of the values are the same as before described.

The method may be carried out in any suitably-arranged apparatus. The mixing-kettle may be provided with a suitable agitator and steam-jacketed, if necessary, and the separating vessel may be provided with means for running off the compound and for discharging the tailings, the parts of the apparatus being preferably arranged so as to enable the separation to be carried on continuously.

The accompanying drawing is a perspective view of a plant in which the method herein described may be practiced.

In the drawing, 1 designates a hopper or bin for the storage of the pulverized ore, and 2 a mixing vessel provided with an agitator in which the ore is mixed with the adhesive agent. From vessel 2 the mass is conducted to a vessel 3 containing water, in which the adhesive agent, with the entrapped values, is separated from the tailings and run to a centrifugal drum 4 for the recovery of said agent, which flows to a storage-tank 5. From the latter adhesive agent is raised by a pump 6 to the initial mixing vessel 2. The tailings are discharged from the separating vessel 3 through a pipe 7. The concentrates are removed from the centrifugal drum and subjected to such further treatment as may be necessary.

What I claim, and desire to secure by Letters Patent, is—

1. The method of concentrating ores consisting in mixing with the pulverized ore rosin-oil, then separating said agent with its entrapped values from the tailings, and finally recovering the values from said agent.

2. The method of concentrating ores consisting in mixing with the pulverized ore rosin-oil, then treating the mass with water to separate said agent with its entrapped values from the tailings, and finally recovering the values from said agent.

3. The method of concentrating ores which consists in mixing with the pulverized ore an agent to which the metallic constituents will adhere consisting of a mixture of a hydrocarbon and rosin-oil, then separating said agent with its entrapped values from the tailings, and finally recovering the values from said agent.

4. The method of concentrating ores which consists in mixing with the pulverized ore an agent to which the metallic constituents will adhere consisting of a mixture of rosin-oil and a normally solid hydrocarbon, then separating said agent with its entrapped values from the tailings, and finally recovering the values from said agent.

5. The method of concentrating ores which consists in mixing with the pulverized ore an agent to which the metallic constituents will adhere consisting of a mixture of rosin-oil and a normally solid hydrocarbon, then treating the mass with water to separate said agent with its entrapped values from the tailings, and finally recovering the values from said agent.

6. The method of concentrating ores which consists in mixing with the pulverized ore an agent to which the metallic constituents will adhere consisting of a mixture of rosin-oil and a normally solid fatty matter, then separating said agent with its entrapped values from the tailings, and finally recovering the values from said agent.

7. The method of concentrating ores which consists in mixing with the pulverized ore an agent to which the metallic constituents will adhere consisting of a mixture of rosin-oil and a non-resinous hydrocarbon, then separating said agent with its entrapped values from the tailings, and finally recovering the values from said agent.

8. The method of concentrating ores which consists in mixing with the pulverized ore an agent to which the metallic constituents will adhere consisting of a melted mixture of rosin-oil and a normally solid hydrocarbon which mixture is solid at normal temperatures, then separating said agent with its entrapped values from the tailings, and finally recovering the values from said agent 9. The method of concentrating ores which consists in mixing with the pulverized ore an agent to which the metallic constituents will adhere consisting of a mixture of rosin-oil and paraffin, then separating said agent with its entrapped values from the tailings, and finally recovering the values from said agent.

In witness whereof I have signed my name to this specification in the presence of two subscribing witnesses.

ALFRED SCHWARZ.

Witnesses:
  SAMUEL M. MARCUS,
  OLIN A. FOSTER.